United States Patent
Kizawa et al.

(10) Patent No.: US 10,460,698 B2
(45) Date of Patent: Oct. 29, 2019

(54) METHOD FOR RENDERING AN ELECTRONIC CONTENT ON A RENDERING DEVICE

(71) Applicant: Orange, Paris (FR)

(72) Inventors: Kazuki Kizawa, Ichikawa (JP); Jeremy Julien Godefroid, Malmo (SE); Asako Nakano, Tokyo (JP)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/107,366

(22) PCT Filed: Dec. 11, 2014

(86) PCT No.: PCT/IB2014/003076
§ 371 (c)(1),
(2) Date: Jun. 22, 2016

(87) PCT Pub. No.: WO2015/097554
PCT Pub. Date: Jul. 2, 2015

(65) Prior Publication Data
US 2017/0006413 A1    Jan. 5, 2017

(30) Foreign Application Priority Data
Dec. 23, 2013    (EP) .................................... 13306830

(51) Int. Cl.
*G09G 5/00* (2006.01)
*H04N 21/41* (2011.01)
(Continued)

(52) U.S. Cl.
CPC ............. *G09G 5/005* (2013.01); *G06F 16/80* (2019.01); *G06F 16/88* (2019.01);
(Continued)

(58) Field of Classification Search
CPC ... H04W 4/008; H04W 84/005; H04W 4/046; G09G 5/005; H04L 69/22; H04L 51/38;
(Continued)

(56) References Cited

U.S. PATENT DOCUMENTS 9,167,394 B2 * 10/2015 Kalhous ................ H04W 4/046
2004/0012627 A1    1/2004 Zakharia et al.
(Continued)

FOREIGN PATENT DOCUMENTS

WO    2010136866 A1    12/2010

OTHER PUBLICATIONS

International Search Report dated Jun. 30, 2015 for corresponding International Application No. PCT/IB2014/003076 filed Dec. 11, 2014.
(Continued)

*Primary Examiner* — Jianxun Yang
(74) *Attorney, Agent, or Firm* — David D. Brush; Westman, Champlin & Koehler, P.A.

(57) ABSTRACT

A method for rendering a electronic content on a rendering device, the rendering device communicating with a mobile device. The method includes: recognition of data acquired by the mobile device in order to obtain metadata associated to the acquired data; selection of a rendering device; retrieval of configuration parameters of the selected rendering device; based on the configuration parameters of the selected rendering device, determination of a set of metadata associated to the acquired data the selected rendering device is able to render; and transmission to the selected rendering device of an electronic content to be rendered, the electronic content consisting at least in the metadata associated to the acquired data.

8 Claims, 3 Drawing Sheets

(51) Int. Cl.
  *H04N 21/442* (2011.01)
  *H04N 21/462* (2011.01)
  *H04N 21/658* (2011.01)
  *H04N 21/84* (2011.01)
  *H04W 4/80* (2018.01)
  *G06F 16/80* (2019.01)
  *G06F 16/84* (2019.01)
  *G06F 16/957* (2019.01)
  *H04L 29/06* (2006.01)

(52) U.S. Cl.
  CPC ..... *G06F 16/9577* (2019.01); *H04N 21/4113* (2013.01); *H04N 21/4126* (2013.01); *H04N 21/4131* (2013.01); *H04N 21/44231* (2013.01); *H04N 21/4621* (2013.01); *H04N 21/6581* (2013.01); *H04N 21/84* (2013.01); *H04W 4/80* (2018.02); *H04L 69/22* (2013.01)

(58) Field of Classification Search
  CPC ............ H04L 65/1016; H04L 65/1066; H04L 65/1093; G06Q 30/06; G06F 17/30772; H04M 1/72558
  See application file for complete search history.

(56) References Cited

U.S. PATENT DOCUMENTS

2011/0131332 A1* 6/2011 Bouazizi ............ H04L 65/1093
                                                    709/227
2013/0016389 A1* 1/2013 Robinson ............. G06F 3/1206
                                                    358/1.15

OTHER PUBLICATIONS

Wang Avery, "The Shazam Music Recognition Service", Communications of the ACM. Association for Computing Machinery. Inc. United States, vol. 49, No. 8, Aug. 31, 2006 (Aug. 31, 2006), pp. 44-48, XP002610302.

Mate et al., "Movable-Multimedia: Session Mobility in Ubiquitous Computing Ecosystem" Dec. 4, 2006 (Dec. 4, 2006),XP055019030.

Robert G Gazda et al., "Demonstration of seamless multimedia session transfer to support pervasive mobile computing", World of Wireless Mobile and Multimedia Networks (WOWMOM), 2010 IEEE International Symposium on A, IEEE, Piscataway, NJ, USA, Jun. 14, 2010 (Jun. 14, 2010), p. 1, XP031722513.

Written Opinion dated Jun. 30, 2015 for corresponding International Application No. PCT/IB2014/003076, filed Dec. 11, 2014.

* cited by examiner

METHOD FOR RENDERING AN ELECTRONIC CONTENT ON A RENDERING DEVICE

CROSS-REFERENCE TO RELATED APPLICATIONS

This Application is a Section 371 National Stage Application of International Application No. PCT/IB2014/003076, filed Dec. 11, 2014, the content of which is incorporated herein by reference in its entirety, and published as WO 2015/097554 on Jul. 2, 2015, in English.

FIELD OF DISCLOSURE

The present invention generally relates to the rendering of an electronic content on a rendering device.

BACKGROUND OF DISCLOSURE

The recent developing of connected mobile devices such as Smartphones, tablets, connected cameras, connected music players, has seen an increase in the number of software algorithms allowing a user of a connected mobile device to retrieve additional information about his surrounding environment, such as object recognition algorithm to recognize monument in front of the user's camera, voice recognition and natural language processing for conversation key topic recognition, sound analysis for music recognition etc.

An example of such software algorithms is Shazam®. Shazam® uses a Smartphone's built-in microphone to gather a brief sample of music being played. An acoustic fingerprint is created based on the sample, and is compared against a central database for a match. If a match is found, information such as the artist, song title, and album are relayed back to the user.

The user of a connected mobile device is now able to visualize additional information on his connected mobile device. However the user is limited in the nature of the additional information displayed and in the sharing of this additional information with other users.

SUMMARY

An exemplary embodiment of the present invention relates to a method for rendering a electronic content on a rendering device, the rendering device communicating with a mobile device, the method comprising the steps of:
Recognition of data acquired by the mobile device in order to obtain metadata associated to the acquired data,
Selection of a rendering device,
Retrieval of configuration parameters of the selected rendering device,
Based on the configuration parameters of the selected rendering device, determination of a set of metadata associated to the acquired data the selected rendering device is able to render,
Transmission to the selected rendering device of an electronic content to be rendered, said electronic content consisting at least in the metadata associated to the acquired data.
The method of the invention enables the rendering of an electronic content on a rendering device, the nature of the rendered electronic content taking into account the specificities of the rendering device.

The data acquired by the mobile device may be of different type, for example, the acquired data may be a piece of music, a picture taken by the camera of the mobile device, a film, a QR code, etc.

The metadata associated to the acquired data may for example the data itself, location information, a related webpage such as Wikipedia, a webpage dedicated to the data, ecommerce websites, etc.

The rendering device may be of any type such as a personal computer, a music player, a video player, a TV set, a tablet, a photo frame, a fridge capable of communicating with other devices, etc. These rendering devices have different rendering capabilities, or configuration parameters, such as the capabilities to render sound, pictures, movies; the screen resolution, an Internet access, the communication technologies supported such as 3G, 4g, NFC, Bluetooth®, location system, etc. that information may be stored in a dedicated database making their retrieval very easy.

Thus, if a user of the mobile device hear a song, he may acquire the song using the mobile device, the acquired data is then recognized using an application such as Deezer®. Metadata related to the song are then obtained. Such metadata may be for example: the song itself, information about the artist playing the song, a TV channel playing or talking about the artist, an URL of the official website of the artist, an URL of a music market where one can buy a copy of the song, pictures of the artist, etc.

The user then selects a rendering device on which he wants to display a content related to the song. For example, if the user chooses to render the content on a personal computer, he will have access to the official website of the artist and to the music market. If the user chooses to render the content on his photo frame, he will have access to pictures of the artist. If the user chooses to render the content on his GPS device, he will have access to the location of the nearest concert of the artist.

Thus the rendered content is adapted to the selected rendering device enabling an easy access and an easy sharing of information related to data acquired by the user.

In some embodiment, the user will have access to both the acquired data and metadata. It is the case when the user takes a picture of a monument, he may have access to both the taken picture and historical information at the same time on the same screen.

According to another feature of the invention, the method comprises the prior step of registering at least one rendering device in a configuration parameters database.

The user selects the rendering device in a pool of rendering devices. Thus, there is no need for the user to search for a specific rendering device when he wants to render an electronic content; he only has to consult a list of registered rendering device.

According to another feature of the invention, the method comprises a step of storing in the configuration parameters database, for each registered rendering device, an identifier of the registered rendering device associated to the configuration parameters of the rendering devices.

According to another feature of the invention, the selection of the rendering device consists in the reception of the identifier of the rendering device by the mobile device.

Since the mobile device of the user and the rendering device communicate with each other, an identifier of the selected rendering device is transmitted from the rendering device to the mobile device during the selecting step.

The mobile device and the rendering device may communicate using NFC (Near Field Communication) technology of Bluetooth™.

According to another feature of the invention, the selection of the rendering device consists in retrieving the identifier of the rendering device.

For example, the user can take a picture with is mobile device of a QR code (Quick Response code) representing the identifier of the rendering device.

Another object of the invention is a mobile device communicating with a rendering device capable of rendering an electronic content, the mobile device comprising means for:

Recognizing data acquired by the mobile device in order to obtain metadata associated to the acquired data, Selecting a rendering device, Retrieving configuration parameters of the selected rendering device, Based on the configuration parameters of the selected rendering device, determining a set of metadata associated to the acquired data the selected rendering device is able to render, Transmitting to the selected rendering device of an electronic content to be rendered, said electronic content consisting at least in the metadata associated to the acquired data.

Such a mobile device is for example a Smartphone, a tablet, a camera, etc.

The invention relates to a system comprising a mobile device, at least one rendering device capable of rendering an electronic content and at least one network equipment, wherein:

The mobile device comprises: means for acquiring data, means for transmitting the acquired data to the network equipment, means for selecting the rendering device, and means for interrogating a configuration parameters database, The network equipment comprises: means of recognizing the data acquired by the mobile device in order to obtain metadata associated to the acquired data, the configuration parameters database, and means for determining a set of metadata associated to the acquired data the selected rendering device is able to render, based on the configuration parameters of the selected rendering device.

Finally, one object of the invention concerns a computer program, in particular a computer program on or in an information medium or memory, suitable for implementing the method object of the invention. This program can use any programming language, and be in the form of source code, binary code, or of code intermediate between source code and object code such as in a partially compiled form, or in any other desirable form for implementing the communication methods according to the invention.

The information medium may be any entity or device capable of storing the programs. For example, the medium can comprise a storage means, such as a ROM, for example a CD ROM or a microelectronic circuit ROM, or else a magnetic recording means, for example a diskette (floppy disk) or a hard disk.

Moreover, the information medium may be a transmissible medium such as an electrical or optical signal, which may be conveyed via an electrical or optical cable, by radio or by other means. The program according to the invention may in particular be downloaded from a network of Internet type.

BRIEF DESCRIPTION OF THE DRAWINGS

The present system and method are explained in further detail, and by way of example, with reference to the accompanying drawings wherein.

DETAILED DESCRIPTION OF ILLUSTRATIVE EMBODIMENTS

Figure 1:
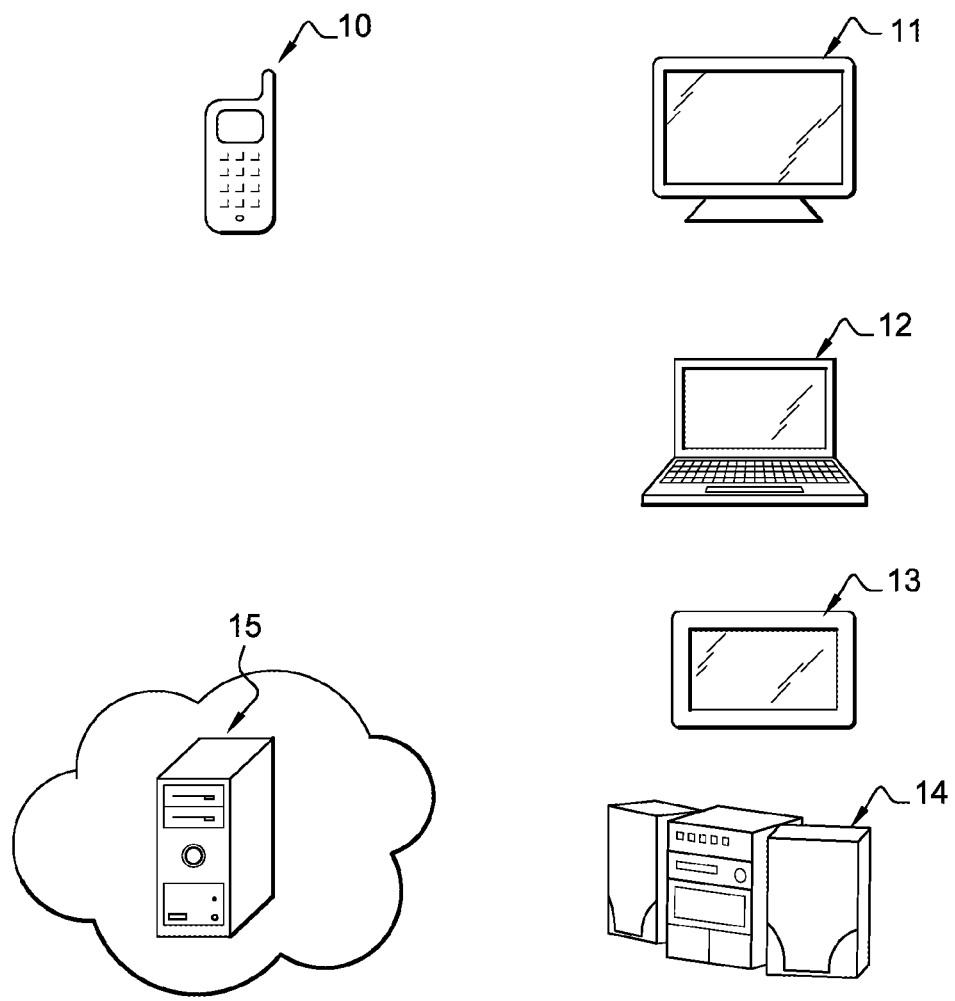
FIG. 1 shows a system in which the method of the invention is executed.

FIG. 1 represents a system in which the method for rendering an electronic content is executed.

In a first embodiment of the invention, the system comprises a mobile device 10, such as a Smartphone or a tablet. Such a mobile device 10 can communicate with other devices using wireless communication technologies such as 3G, 4G, Wi-Fi, NFC, Bluetooth®, etc.

The system comprises a plurality of rendering devices 11-14 such as a TV set 11, a laptop 12, a photo frame 13, and a music system 14. Each of these rendering devices 11-14 can communicate with other devices using wireless communication technologies such as 3G, 4G, Wi-Fi, NFC, Bluetooth®, etc.

In a second embodiment of the invention, the system further comprises a server 15 located in a telecommunication network. The mobile device 10 and the rendering devices 11-14 may communicate with the server 15.

In reference to FIG. 1, a user of the mobile device 10 hears a piece of music while shopping in a mall. Using the mobile device 10, the sound of the piece of music is recorded by the mobile device 10. The recorded sound is then processed using, for example, recognition software, in order to obtain metadata related to the piece of music. Such metadata may be: the name of the artist, the name of the album of the piece of music, URL of websites related to the artists, URL of websites where the user may listen to or buy the piece of music, pictures of the artist, etc.

Back home, the user of the mobile device selects a rendering device among the rendering devices 11-14 on which he wants to retrieve information related to the piece of music he recorded while at the mall. The user selects for example the photo frame 13 on his mobile device 10. Then a set of information related to the piece music that can be rendered on the photo frame 13 is selected among the information retrieved, in this case the set of information contains pictures of the artist. The mobile device 10 then pushes pictures of the artist on the photo frame 13 using, for example, Bluetooth®.

Figure 2:
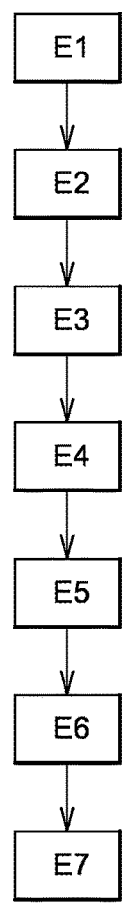
FIG. 2 shows a diagram representing the steps of the method of the invention.

FIG. 2 represents a diagram representing the steps of the method of the invention.

In a step E1, the rendering devices 11-14 are registered. In an embodiment of the invention, the rendering devices are registered in the mobile device 10.

The mobile device 10 communicates with each rendering device 11-14, using for example NCF technology, and receives an identifier of each of the rendering device 11-14 and stores the identifiers in a memory of the mobile device 10. The mobile device 10 may also retrieve the identifiers of the rendering devices by reading QR codes displayed on the rendering devices 11-14.

In another embodiment of the invention, the identifiers of the rendering devices are stored in a database DB. The database DB is embedded, for example, in the server 15. In this embodiment, the mobile device 10 transmits the identifiers to the server 15. This enable another device of the user to access the identifiers of the rendering devices 11-14.

In a step E2, the mobile device 10 acquires data. For example the user of the mobile device 10 takes a picture of a monument with a camera of the mobile device 10, or still using the camera of the mobile device 10 reads a QR code printed on a food plate already made.

In a step E3, the acquired data is processed or recognized in order to obtain metadata associated to the acquired data. If the acquired data is a picture, then an object recognition algorithm or a face recognition algorithm is applied to the data in order to obtain the metadata associated to the acquired data.

The step E3 can be executed by the mobile device 10, the metadata obtained being stored in a memory of the mobile device 10. The step E3 can be executed by the server 15, the metadata obtained being in stored in a database of the server 15.

In a step E4, a rendering device 11-14 is selected. The selection of the rendering device 11-14 consists in the mobile device 10 retrieving the identifier of the selected rendering device from the rendering device 11-14.

The mobile device 10 may receive the identifier of the selected rendering device during a communication session established between the mobile device 10 and the selected rendering device. Such a communication session may be a communication session established according the requirements of the NFC technology or Bluetooth®.

The mobile device 10 may retrieve the identifier of the rendering device reading a QR code displayed on the rendering device.

The rendering device may also be selected by picking the identifier of the rendering device in the list of registered rendering devices stored in the mobile device 10 or in the database DB during step E1.

In a step E5, configuration parameters of the selected rendering device are retrieved. Configuration parameters may be for example: the capabilities of the rendering device to render sound, pictures, movies; the screen resolution, an Internet access, a location system, applications downloaded on the rendering device, home appliance functionality such as setup of the temperature, setup of the luminosity, etc.

The mobile device 10 may receive the configuration parameters of the rendering device along with the identifier of the selected rendering device during the communication session established between the mobile device 10 and the selected rendering device.

The mobile device 10 may retrieve the configuration parameters of the rendering device by reading the QR code displayed on the rendering device.

The configuration parameters can also be retrieved by picking the identifier of the rendering device in the list of registered rendering devices stored in the mobile device 10 or in the database DB during step E1.

In a step E6, based on the configuration parameters of the selected rendering device, a set of metadata associated to the acquired data the selected rendering device is able to render is obtain.

Using the configuration parameters of the selected rendering device, the metadata are sorted in two sets. A first set of metadata consists in the metadata the selected rendering device is capable to render. The second set of metadata consists in the metadata the selected rendering device is not capable to render.

For example, if the selected rendering device is the photo frame 13, metadata such as pieces of music, URL of websites, TV channels, that cannot be rendered on the photo frame 13 are set aside. Only pictures related to the acquired data will be part of the first set of metadata.

In an embodiment of the invention, the step E6 is executed by the mobile device 10. In another embodiment of the invention, the step E6 is executed by the server 15.

In a step E7, an electronic content consisting at least in the first set of metadata is transmitted to the selected rendering device.

The first set of metadata is transmitted to the rendering device either by the mobile device 10 or the server 15 during a communication session established between the transmitting device and the rendering device.

Figure 3:
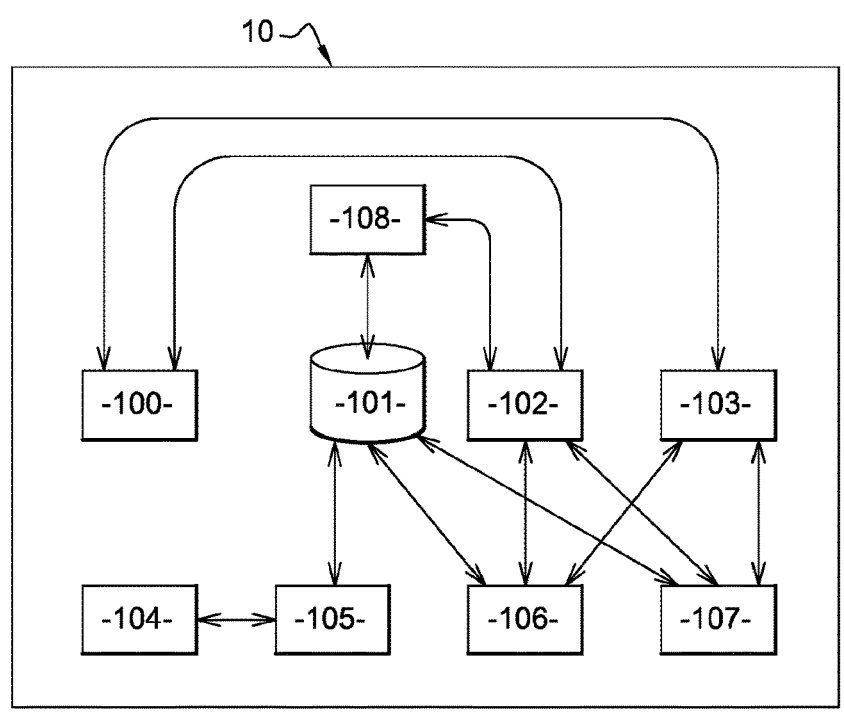
FIG. 3 shows a mobile device according to the first embodiment of the invention.

FIG. 3 represents a mobile device 10 according to the first embodiment of the invention.

In the first embodiment of the invention, the mobile device 10 comprises means 100 for registering the rendering devices 11-14. The rendering devices are registered in a memory 101 the mobile device 10 connected to the registering means 100.

The mobile device 10 comprises means 102 for communicating with each rendering device 11-14, using for example NCF technology, and receiving an identifier of each of the rendering device 11-14. The means for communicating 102 are connected to the registering means 100.

The mobile device 10 also comprises means 103 for retrieving the identifiers of the rendering devices by reading QR codes displayed on the rendering devices 11-14. The retrieving means 103 are connected to the registering means 100.

The mobile device 10 comprises means 104 for acquiring data, such as a microphone, a camera, etc.

The means 104 for acquiring data are connected to means 105 for recognizing data in order to obtain metadata associated to the acquired data such as an object recognition algorithm or a face recognition algorithm. The metadata obtained is stored in the memory 101 of the mobile device 10.

The mobile device comprises means 106 for selecting a rendering device 11-14. The selected means 106 are connected to the means 102 for communicating and the retrieving means 103.

The mobile device 10 may receive the identifier of the selected rendering device during a communication session established between the mobile device 10 and the selected rendering device using the means 102 for communicating.

The mobile device 10 may retrieve the identifier of the rendering device reading a QR code displayed on the rendering device using the retrieving means 103.

The rendering device may also be selected by picking the identifier of the rendering device in the list of registered rendering devices stored in the memory 101 of the mobile device 10 using the selecting means 106.

The mobile device 10 comprises means 107 for retrieving the configuration parameters of the selected rendering device.

The mobile device 10 may receive the configuration parameters of the rendering device along with the identifier of the selected rendering device during the communication session established between the mobile device 10 and the selected rendering device using the means 102 for communicating.

The mobile device 10 may retrieve the configuration parameters of the rendering device by reading the QR code displayed on the rendering device using the retrieving means 103.

The configuration parameters can also be retrieved by picking the identifier of the rendering device in the list of registered rendering devices stored in the memory 101 of the mobile device 10 using the selecting means 107.

The mobile device 10 comprises means 108 for obtaining, based on the configuration parameters of the selected rendering device, a set of metadata associated to the acquired data the selected rendering device is able to render. The means 108 for obtaining a set of metadata are connected to the memory 101 and to the means 102 for communicating. An electronic content consisting at least in the first set of metadata is transmitted to the selected rendering device using of the means 108 for obtaining the set of metadata and the means 102 for communicating.

Figure 4A:
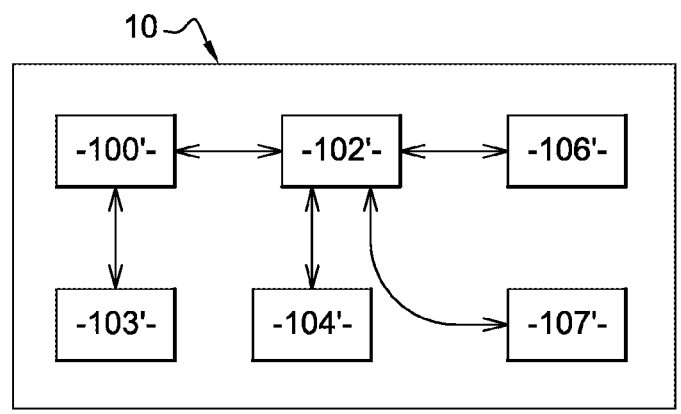
FIG. 4A shows a mobile device according to the second embodiment of the invention.

FIG. 4A represents a mobile device 10 according to the second embodiment of the invention.

In the second embodiment, the mobile device 10 comprises means 100' for registering the rendering devices 11-14. The rendering devices are registered in a memory of a server 15 communicating with the registering means 100' using means 102' for communicating with the server 15.

The mobile device 10 also comprises means 103' for retrieving the identifiers of the rendering devices by reading QR codes displayed on the rendering devices 11-14. The retrieving means 103' are connected to the registering means 100'.

The mobile device 10 comprises means 104' for acquiring data, such as a microphone, a camera, etc.

The means 104' for acquiring data are communicating with the server 15 with the communication means 102' for recognizing data in order to obtain metadata associated to the acquired data.

The mobile device comprises means 106' for selecting a rendering device 11-14. The selected means 106' are connected to the means 102' for communicating with the server 15.

The rendering device is selected by picking the identifier of the rendering device in the list of registered rendering devices stored in the memory of the server 15.

The mobile device 10 comprises means 107' for retrieving the configuration parameters of the selected rendering device. The retrieving means 107' are connected to the means 102' for communicating with the server 15.

The configuration parameters are retrieved by picking the identifier of the rendering device in the list of registered rendering devices stored in the memory of the server 15.

Figure 4B:
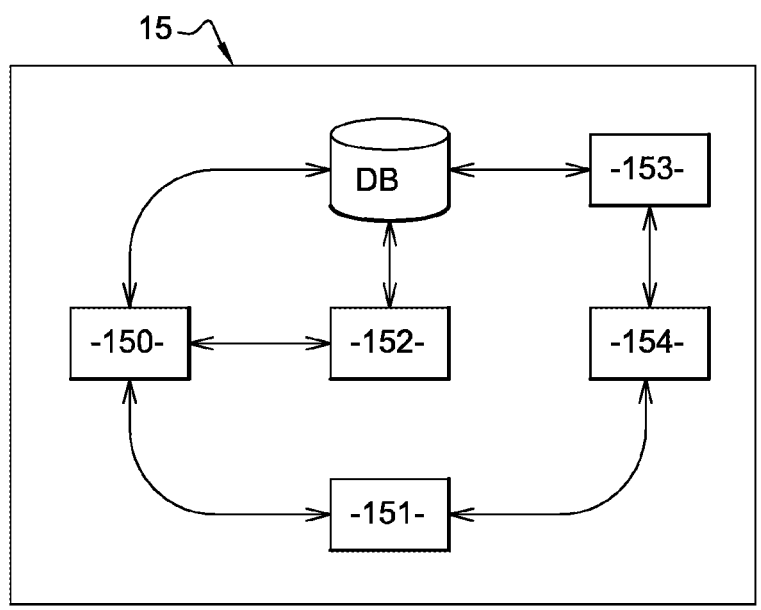
FIG. 4B shows a server according to the second embodiment of the invention.

FIG. 4B represents a server 15 according to the second embodiment of the invention.

The server 15 comprises means 150 for communicating with the mobile device 10 and the rendering devices 11-14. Such communication means 150 may be for example a NFC antenna/NFC receiver, a Bluetooth® transceiver, etc.

The server 15 may receives using the communication means 150 an identifier of each of the rendering device 11-14 and stores the identifiers in a memory DB. When the mobile device 10 retrieves the identifiers of the rendering devices by reading QR codes displayed on the rendering devices 11-14, the mobile device 10 sends them to the communication means 150 of the server 15.

Connected to the communication means 150, the server 15 comprises means 151 of recognizing the data acquired by the mobile device 10 and transmitted to the server 15 in order to obtain metadata associated to the acquired data. The acquired data is processed or recognized by the recognizing means 151 in order to obtain metadata associated to the acquired data. If the acquired data is a picture, then an object recognition algorithm or a face recognition algorithm is applied to the data in order to obtain the metadata associated to the acquired data.

The server 15 comprises means 152 for selecting the rendering device by picking the identifier of the rendering device in the list of registered rendering devices stored in memory DB. The selection means 152 are connected to the communication means 150 in order to receive from the mobile device 10 the identifier of a rendering device.

The server 15 also comprises means 153 of retrieving in the memory DB the configuration parameters of the selected rendering devices 11-14 stored in the memory DB.

The server comprises means 154 for determining, based on the configuration parameters of the selected rendering device and the metadata obtained by the recognition means 151, a set of metadata associated to the acquired data the selected rendering device is able to render.

The electronic content consisting at least in the first set of metadata is then transmitted to the selected rendering device using the communication means 150.

An exemplary embodiment of the present invention to overcome disadvantages and/or make improvements in the prior art.

Although the present disclosure has been described with reference to one or more examples, workers skilled in the art will recognize that changes may be made in form and detail without departing from the scope of the disclosure and/or the appended claims.

The invention claimed is:

1. A method for rendering electronic content on a rendering device, the rendering device communicating with a mobile device, the method comprising the following acts performed by the mobile device:
    acquiring data by the mobile device,
    recognition of the data acquired by the mobile device,
    obtaining a set of metadata associated to the acquired data, said metadata being able to be rendered,
    selection of a rendering device,
    retrieval of configuration parameters of the selected rendering device,
    based on the configuration parameters of the selected rendering device, determining that the selected rendering device can only render a part of said set of metadata, sorting said metadata associated to the acquired data into first and second sets, the first set comprising any of the metadata that the selected rendering device is able to render, and the second set comprising any of the metadata that the selected rendering device is not able to render,
    transmission to the selected rendering device of the electronic content to be rendered, said electronic content comprising, among said metadata, only all or part of the first set of metadata associated to the acquired data, and
    rendering acquired data on the mobile device and said all or part of the first set of additional information on the selected rendering device.

2. The method of claim 1 comprising a prior act of registering at least one rendering device in a configuration parameters database.

3. The method of claim 2 comprising an act of storing in the configuration parameters database, for each registered rendering device, an identifier of the registered rendering device associated to configuration parameters of the rendering devices.

4. The method of claim 3, wherein the selection of the rendering device comprises reception of the identifier of the rendering device by the mobile device.

5. The method of claim 3, wherein the selection of the rendering device comprises retrieving the identifier of the rendering device.

6. A mobile device communicating with a rendering device capable of rendering electronic content, the mobile device comprising:
- a non-transitory computer-readable medium comprising instructions stored thereon;
- a computer configured by the instructions to:
  - acquire data,
  - recognize the data acquired by the mobile device
  - obtain a set of metadata associated to the acquired data, said metadata being able to be rendered,
  - select a rendering device,
  - retrieve configuration parameters of the selected rendering device, said configuration parameters being stored in a configuration parameters database,
- based on the configuration parameters of the selected rendering device, determining that the selected rendering device can only render a part of said set of metadata, sorting said metadata associated to the acquired data into first and second sets, the first set comprising any of the metadata that the selected rendering device is able to render, and the second set comprising any of the metadata that the selected rendering device is not able to render, and
- transmit to the selected rendering device an electronic content to be rendered, said electronic content comprising, among said metadata, all or part of the first set of metadata associated to the acquired data, and
- rendering acquired data on the mobile device and said all or part of the first set of additional information on the selected rendering device.

7. A system comprising:
- a mobile device, at least one rendering device capable of rendering electronic content, wherein the mobile device comprises:
  - a non-transitory computer-readable medium comprising instructions stored thereon;
  - a computer configured by the instructions to acquire data, transmit the acquired data to at least one network equipment, select the rendering device, and interrogate a configuration parameters database, and
- the at least one network equipment, which comprises:
  - the configuration parameters database;
  - a non-transitory computer-readable medium comprising instructions stored thereon;
  - a computer configured by the instructions to recognize the data acquired by the mobile device in order to obtain a set of metadata associated to the acquired data, said metadata being able to be rendered, determine that the selected rendering device can only render a part of said set of metadata, sort a set of metadata associated to the acquired data into first and second sets, the first set comprising any of the metadata that the selected rendering device is able to render and the second set comprising any of the metadata that the selected rendering device is not able to render, based on the configuration parameters of the selected rendering device, transmit the electronic content to be rendered to the selected rendering device, the electronic content including, among said metadata, only all or part of the first set of metadata associated to the acquired data, and render acquired data on the mobile device and said all or part of the first set of additional information on the selected rendering device.

8. A non-transitory computer-readable medium comprising a computer program stored thereon, which comprises program code instructions for rendering electronic content on a rendering device when the program is executed by a processor of a mobile device, the rendering device communicating with the mobile device, wherein the instructions configure the processor of the mobile device to:
- acquire data by the mobile device,
- recognize the data acquired by the mobile device;
- obtain a set of metadata associated to the acquired data, said metadata being able to be rendered,
- select a rendering device,
- retrieve configuration parameters of the selected rendering device,
- based on the configuration parameters of the selected rendering device, determining that the selected rendering device can only render a part of said set of metadata, sorting said metadata associated to the acquired data into first and second sets, the first set comprising any of the metadata that the selected rendering device is able to render, and the second set comprising any of the metadata that the selected rendering device is not able to render,
- transmit to the selected rendering device the electronic content to be rendered, said electronic content comprising, among said metadata, all or part of the first set of metadata associated to the acquired data, and
- render acquired data on the mobile device and said all or part of the first set of additional information on the selected rendering device.

* * * * *